United States Patent
Kitazawa

(10) Patent No.: US 9,983,411 B2
(45) Date of Patent: May 29, 2018

(54) CONTROL APPARATUS AND CORRECTION METHOD

(71) Applicant: CANON KABUSHIKI KAISHA, Tokyo (JP)

(72) Inventor: Kyohei Kitazawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 120 days.

(21) Appl. No.: 15/217,162

(22) Filed: Jul. 22, 2016

(65) Prior Publication Data

US 2017/0032495 A1 Feb. 2, 2017

(30) Foreign Application Priority Data

Jul. 31, 2015 (JP) ................. 2015-152688

(51) Int. Cl.
| | |
|---|---|
| *G09G 5/00* | (2006.01) |
| *G02B 27/01* | (2006.01) |
| *G06F 3/01* | (2006.01) |
| *H04S 7/00* | (2006.01) |
| *H04N 13/00* | (2018.01) |
| *G02B 27/00* | (2006.01) |

(52) U.S. Cl.
CPC ..... *G02B 27/0179* (2013.01); *G02B 27/0093* (2013.01); *G02B 27/017* (2013.01); *G06F 3/012* (2013.01); *H04N 13/0014* (2013.01); *H04S 7/301* (2013.01); *H04S 7/303* (2013.01); *G02B 2027/014* (2013.01); *G02B 2027/0187* (2013.01)

(58) Field of Classification Search
CPC .............. G02B 27/017; G02B 27/0093; G02B 27/0179
See application file for complete search history.

(56) References Cited

U.S. PATENT DOCUMENTS

| | | | |
|---|---|---|---|
| 6,593,956 B1 * | 7/2003 | Potts ................... | G01S 3/7865 348/14.09 |
| 2005/0033147 A1 * | 2/2005 | Wada .................. | A61B 6/5247 600/407 |
| 2012/0288114 A1 * | 11/2012 | Duraiswami ......... | H04R 1/406 381/92 |
| 2013/0237037 A1 * | 9/2013 | Sakai ................ | H01L 21/02378 438/478 |
| 2015/0205575 A1 | 7/2015 | Kitazawa | |
| 2015/0341735 A1 | 11/2015 | Kitazawa | |
| 2017/0013389 A1 | 1/2017 | Kitazawa | |

FOREIGN PATENT DOCUMENTS

| | | |
|---|---|---|
| JP | 2001-197598 A | 7/2001 |
| JP | 2002-171460 A | 6/2002 |
| JP | 2010-191544 A | 9/2010 |

* cited by examiner

*Primary Examiner* — Ryan R Yang
(74) *Attorney, Agent, or Firm* — Carter, DeLuca, Farrell & Schmidt LLP

(57) ABSTRACT

A control apparatus includes: a displacement detection unit adapted to detect, based on a result of acquiring audio outputted from an output apparatus, the result of acquiring being acquired in a display apparatus that displays an image in accordance with motion, and the image that the display apparatus displays, displacement between coordinate axes of an image space according to the image that the display apparatus displays and coordinate axes of an acoustic space according to audio outputted by the output apparatus; and a correction unit adapted to correct the displacement of the coordinate axes detected by the displacement detection unit.

21 Claims, 13 Drawing Sheets

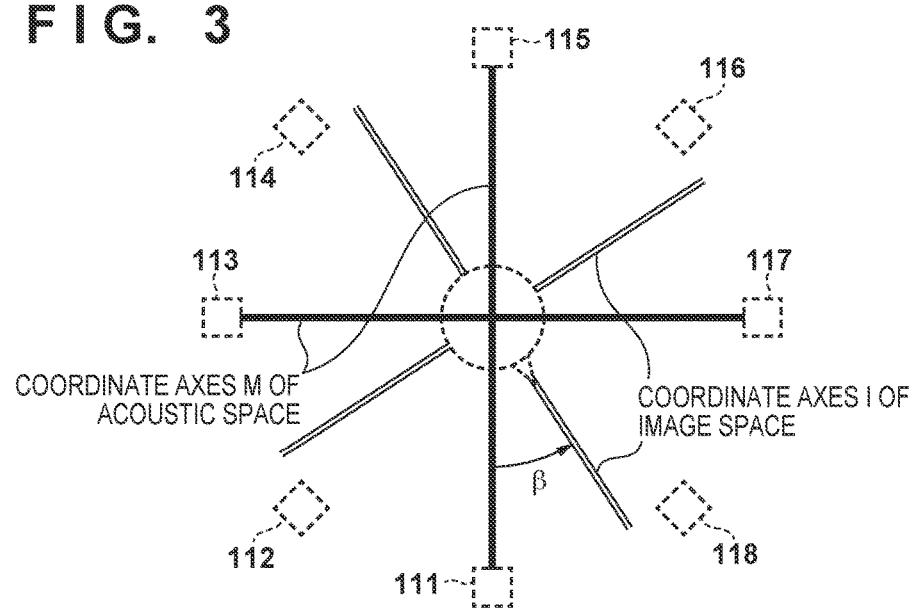
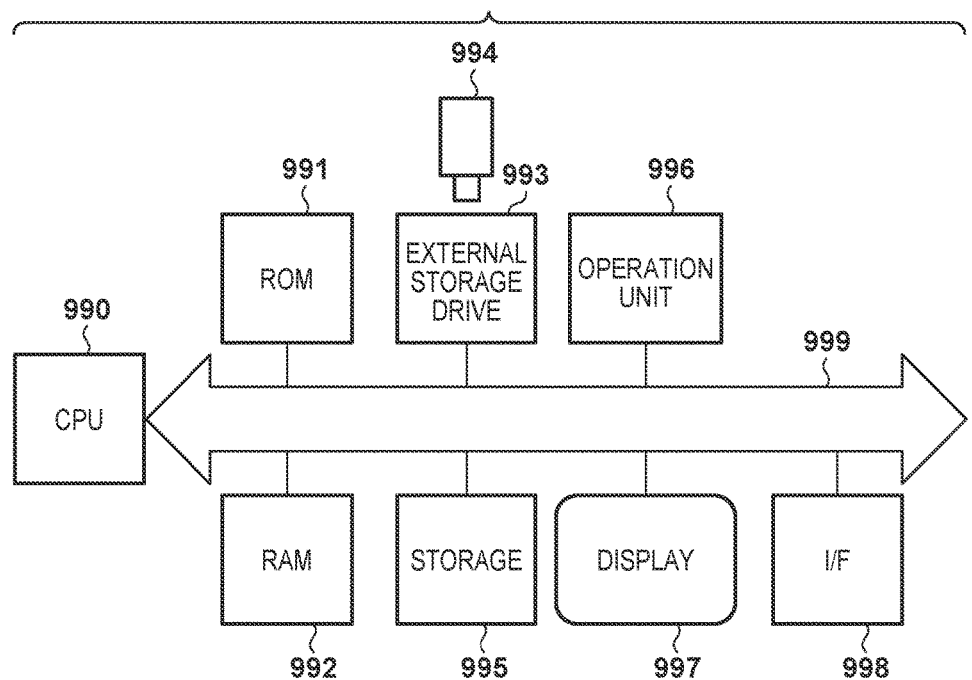

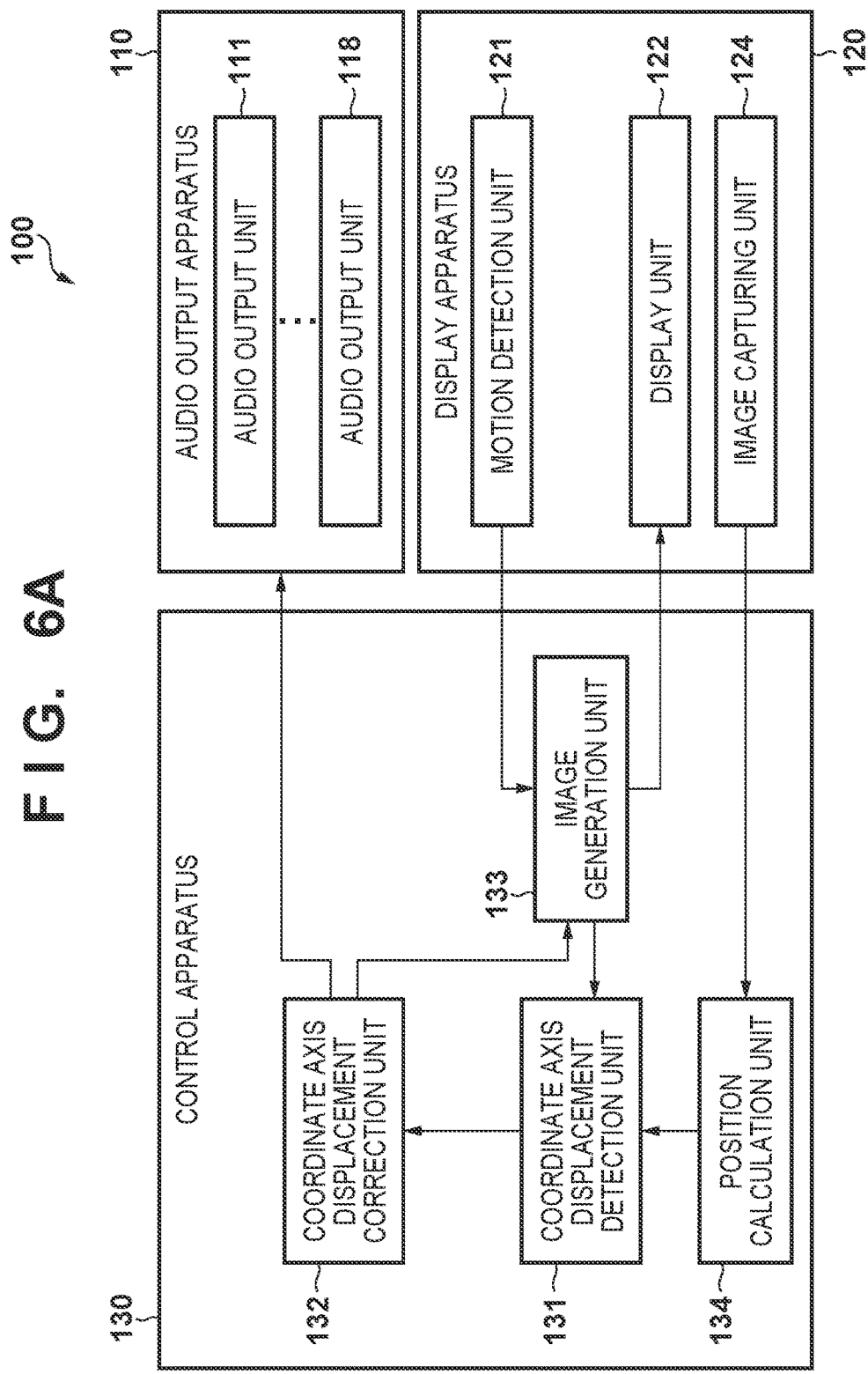

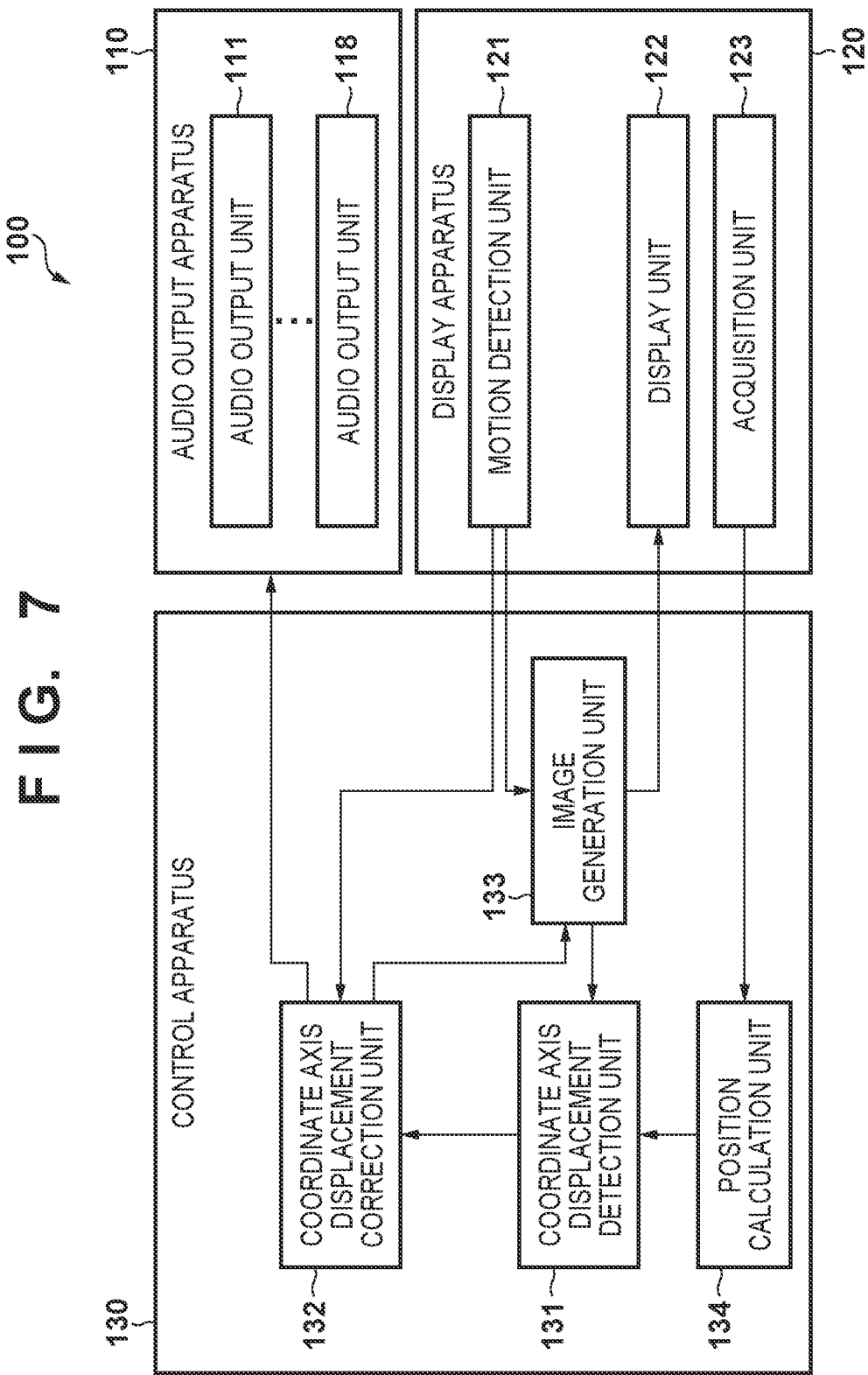

CONTROL APPARATUS AND CORRECTION METHOD

BACKGROUND OF THE INVENTION

Field of the Invention

The present invention relates to a control apparatus and a correction method.

Description of the Related Art

In recent years, research and development has been actively performed for a configuration for providing a free viewpoint video image in which a viewer can appreciate content while selecting an area he or she wishes to view. Also, a head mounted display (HMD: Head Mounted Display) of a head tracking type and a display of handheld type have been put into practical use as devices for enjoying free viewpoint video content. There are omnidirectional images, which are free viewpoint video content, that join and align a virtual space configured by CG (Computer Graphics) or the like, and images captured simultaneously by a plurality of cameras.

Meanwhile, a configuration that presents audio content corresponding to an omnidirectional moving image using headphones of a head tracking type is known (Japanese Patent Laid-Open No. 2002-171460). This method presents audio matched to the omnidirectional video image even with headphones by the convolution of a head-related transfer function (HRTF: Head-Related Transfer Function) with a sound source in accordance with a result of head tracking.

Also, as separate omnidirectional audio presentation, a method in which a plurality of speakers are arranged so as to surround a periphery of a user, as typified by surround sound, is known.

In the case of causing free viewpoint video content to be displayed on a movable display apparatus such as an HMD, there is a possibility that, if an apparatus for detecting motion of the head on which the HMD is arranged is used for a long time, real space coordinate axes and image space coordinate axes displayed in the HMD become displaced due to accumulation of error. Therefore, in a configuration using a movable display apparatus such as an HMD and a plurality of speakers whose positions are fixed, there is a problem in that coordinate axes of image space displayed in the HMD and the coordinate axes of the acoustic space of the audio output by the plurality of speakers do not necessarily match. If the coordinate axes of image space displayed in the HMD and coordinate axes of the acoustic space of the audio output by the plurality of speakers do not match, it may feel unnatural to the viewer, and cause a reduction of a realistic sensation for a reproduction of free viewpoint video content.

The present invention was conceived to solve above described problems, and an objective is to provide a technique that can match coordinate axes of an acoustic space and coordinate axes of an image space.

SUMMARY OF THE INVENTION

According to one aspect of the present invention, a control apparatus includes: a displacement detection unit adapted to detect, based on a result of acquiring audio outputted from an output apparatus, the result of acquiring being acquired in a display apparatus that displays an image in accordance with motion, and the image that the display apparatus displays, displacement between coordinate axes of an image space according to the image that the display apparatus displays and coordinate axes of an acoustic space according to audio outputted by the output apparatus; and a correction unit adapted to correct the displacement of the coordinate axes detected by the displacement detection unit.

According to another aspect of the present invention, a control apparatus includes: a displacement detection unit adapted to detect, based on an image that a display apparatus that displays the image in accordance with motion displays, displacement between coordinate axes of an image space according to the image that the display apparatus displays and coordinate axes of an acoustic space according to audio outputted by an output apparatus; and a correction unit adapted to correct the displacement of the coordinate axes detected by the displacement detection unit.

According to still another aspect of the present invention, a correction method includes: detecting, based on a result of acquiring audio outputted from an output apparatus, the result of acquiring being acquired in a display apparatus that displays an image in accordance with motion, and the image that the display apparatus displays, displacement between coordinate axes of an image space according to the image that the display apparatus displays and coordinate axes of an acoustic space according to audio outputted by the output apparatus; and correcting the detected displacement of the coordinate axes.

Further features of the present invention will become apparent from the following description of exemplary embodiments (with reference to the attached drawings).

BRIEF DESCRIPTION OF THE DRAWINGS

FIG. 3 is a figure schematically illustrating displacement between coordinate axes of an image space and coordinate axes of an acoustic space.

FIG. 4 is the block diagram for illustrating a hardware configuration of a control apparatus.

FIG. 6A and FIG. 6B are block diagrams illustrating a configurations of the highly realistic sensation reproduction system.

FIG. 7 is a block diagram illustrating a configuration of the highly realistic sensation reproduction system.

DESCRIPTION OF THE EMBODIMENTS

Below, with reference to the attached figures, a detailed explanation is given, based on embodiments of the present invention. Note that configurations illustrated in the following embodiments are merely examples, and the present invention is not limited to the illustrated configurations.

(Highly Realistic Sensation Reproduction System)

Figure 1:
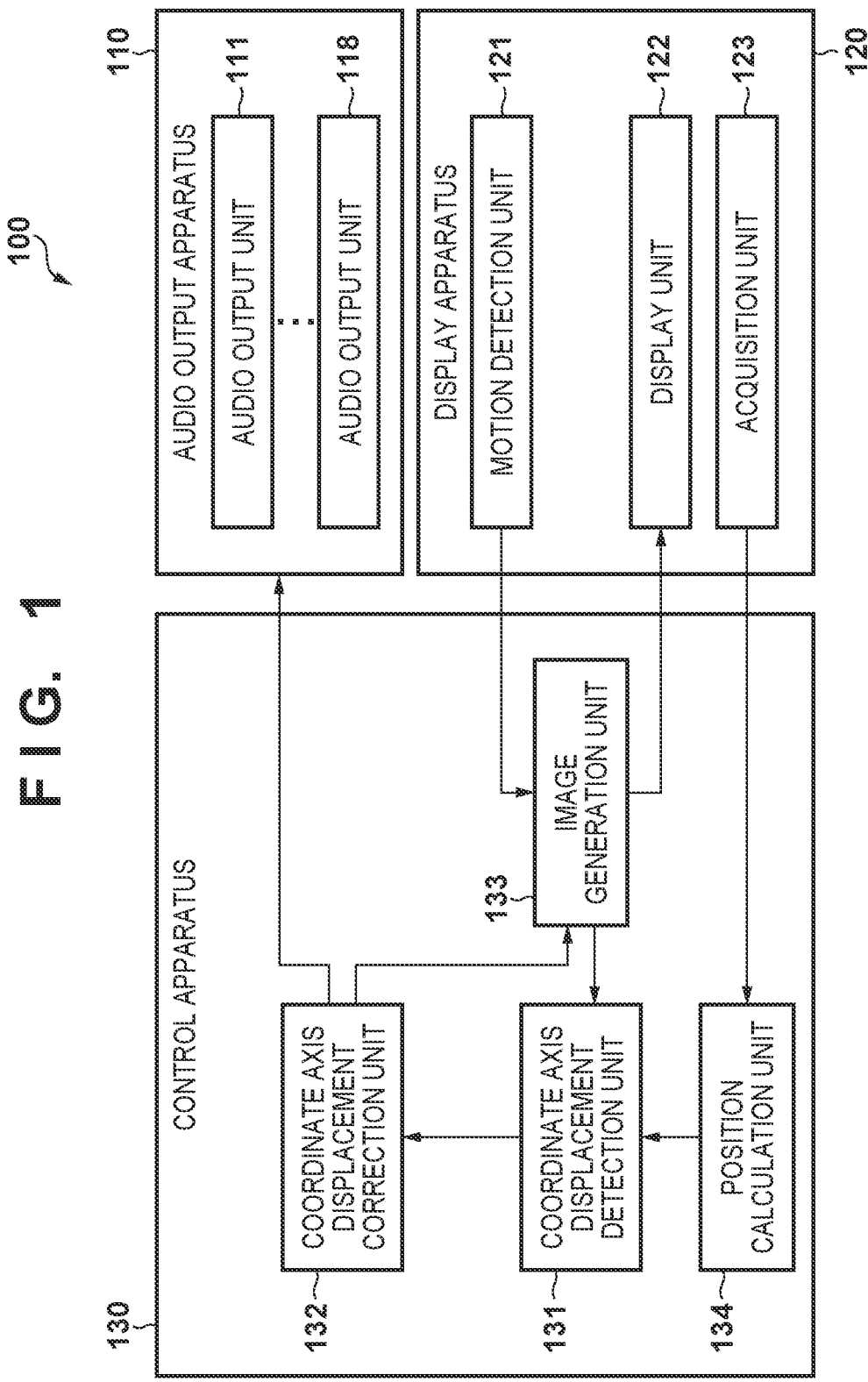
FIG. 1 is a block diagram illustrating a configuration of a highly realistic sensation reproduction system.

FIG. 1 is a block diagram expressing a configuration of a highly realistic sensation reproduction system 100 according to an embodiment of the present invention. The highly realistic sensation reproduction system 100 of the present embodiment is equipped with an audio output apparatus 110, a display apparatus 120, and a control apparatus 130.

Figure 2:
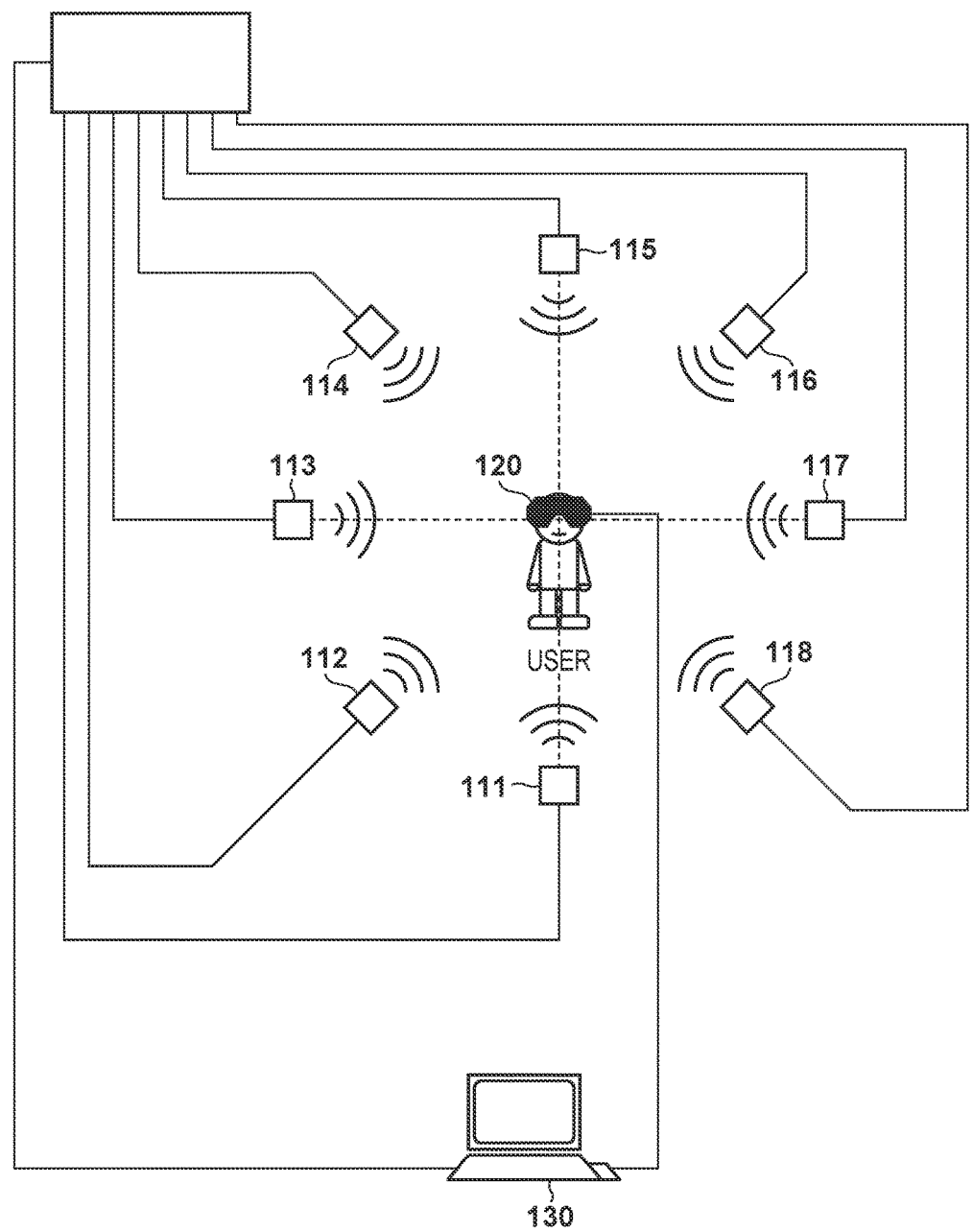
FIG. 2 is a schematic diagram illustrating an example of an arrangement of an audio output unit.

The audio output apparatus 110 is equipped with a plurality of audio output units (acoustic signal output unit) 111-118. Each of the audio output units 111-118, for example, can be configured by a speaker, and outputs audio (sound) corresponding to an input waveform signal to a space. In the present embodiment, an example is explained in for a case in which, for the plurality of audio output units 111-118, eight speakers are installed concentrically at equal angle intervals (45 degrees) as so as to surround a user on a horizontal plane, as illustrated in FIG. 2. Here, coordinate axes of the acoustic space indicate, for example, an axis that connects the audio output unit 111 and the audio output unit 115, and an axis orthogonal thereto that connects the audio output unit 113 and the audio output unit 117. In a case such as in FIG. 2, a signal of content is obtained by radially arranging eight gun microphones that have a directivity of about 45 degrees, for example, and acquiring audio therefrom.

The display apparatus 120 is equipped with a motion detection unit 121, a display unit 122, and an acquisition unit 123. The display apparatus 120 displays images in accordance with motion. In the present embodiment, the display apparatus 120 is an HMD (Head Mounted Display) that is used by mounting it on the head of a user as illustrated in FIG. 2. The display target content is an omnidirectional image in which a real space is captured by an image capture apparatus. A display target image includes not only a still image but also a moving image. Here, when operation of the system is first started, coordinate axes of an image space of the content and coordinate axes of the acoustic space match.

The motion detection unit 121 detects a motion of the head of the user, and outputs a detection result. The motion detection unit 121 is provided with an acceleration sensor, an electronic compass, a tilt sensor, and a GPS (Global Positioning System) sensor, for example, and a value detected by each sensor is used to detect motion, such as rotation, tilting, and movement of the head of the user.

The display unit 122 is a display that is arranged in front of the eyes of the user, and displays an image input from the control apparatus 130.

The acquisition unit 123 is a microphone array comprising a plurality of non-directional microphones arranged in the display apparatus 120. The acquisition unit 123 acquires acoustic signals output from the audio output units 111-118.

The control apparatus 130 is provided with a coordinate axis displacement detection unit 131, a coordinate axis displacement correction unit 132, an image generation unit 133, and a position calculation unit 134.

The coordinate axis displacement detection unit 131 detects a displacement between coordinate axes of an image space of an image displayed in the display unit 122, and coordinate axes from directions of the audio output units 111-118 with respect to the display apparatus 120, which are input from the later described position calculation unit 134. The coordinate axis displacement detection unit 131, based on an acquisition result that is acquired in the acquisition unit 123 and an image displayed by the display apparatus 120, detects displacement between coordinate axes of an image space in accordance with the image displayed by the display apparatus 120, and coordinate axes of an acoustic space in accordance with audio output by the audio output apparatus 110. FIG. 3 is used for simple explanation. A displacement amount $\beta$ is expressed by an angle, for example, and in the present embodiment is a magnitude of rotational displacement in a horizontal direction between coordinate axes I of the image space and coordinate axes M of the acoustic space. Rotational displacement is generated by initial displacement and accumulation of errors. The coordinate axis displacement detection unit 131 outputs the detected displacement amount $\beta$ of the coordinate axes.

The coordinate axis displacement correction unit 132 performs correction of the coordinate axes so as to make the coordinate axis displacement small, based on the displacement amount $\beta$ input from the coordinate axis displacement detection unit 131. In other words, a detected motion amount is corrected in accordance with the detected displacement amount. For example, the coordinate axes of the image space of an omnidirectional image input to the later described image generation unit 133 is rotated so as to match the coordinate axes of the acoustic space.

The image generation unit 133 clips and outputs a portion from the omnidirectional image input. The image generation unit 133, in accordance with the output result of the motion detection unit 121, modifies the position of an image that is clipped in accordance with head position movement by the user so that it is as if the user is in the image space.

The position calculation unit 134 calculates a direction of an audio output unit with respect to the display apparatus 120, from an acoustic signal acquired in the acquisition unit 123. Various methods for sound source tracking or sound source direction estimation that use a multichannel acoustic signal are known, and calculation by use of, for example, a beamformer or the like, is possible. Here, it is possible to use a content signal as a signal for calculating a direction of an audio output unit. When the signal of a specific channel, among signals input to the audio output units 111-118, is sufficiently large in comparison to other channels, signal of that time period can be used to calculate the direction of the audio output unit from which the signal of that channel is output.

(Hardware Configuration of Control Apparatus)

FIG. 4 is a block diagram that schematically illustrates an example of a hardware configuration of the control apparatus 130. The control apparatus 130 is realized, for example, by a personal computer (PC), an embedded system, a tablet terminal, or the like.

In FIG. 4, the CPU 990 is a central arithmetic processing device, and it controls operations of the control apparatus 130 overall by cooperating with other configuration elements, based on an operating system (OS), application programs, or the like. A ROM 991 is a read-only memory, and it stores, for example, data used in main processes, and computer programs such as a basic I/O program. A RAM 992 is a writeable memory, and functions as a work area or the like of the CPU 990.

An external storage drive 993 realizes access to a storage medium, and it is possible to load a computer program or the like stored in media (a storage medium) 994 into the present system. The media 994 includes, for example, a CD-ROM, a DVD, blue ray disk, a USB memory, a flash memory, or the like. A storage 995 is an apparatus that functions as a large capacity memory, and in the present embodiment an SSD (solid state drive) is used. Stored in the storage 995 are an OS, application programs, and the like. The storage 995 can also be realized by another apparatus, such as a hard disk apparatus.

An operation unit 996 is an apparatus that accepts input of commands or instructions from a user, and corresponds to a touch panel, a keyboard, a pointing device, or the like. A display 997 is a display apparatus for displaying, for example, a command input from the operation unit 996, and a corresponding response output of the control apparatus 130. An interface (I/F) 998 is an apparatus for relaying an exchange of data with the audio output apparatus 110 or the display apparatus 120. A system bus 999 is a data bus for controlling a flow of data in the control apparatus 130.

Note that, by software that realizes functions similar to that of each of the above apparatuses, it is possible to configure an alternative to hardware apparatuses.

(Signal Processing)

Figure 5:
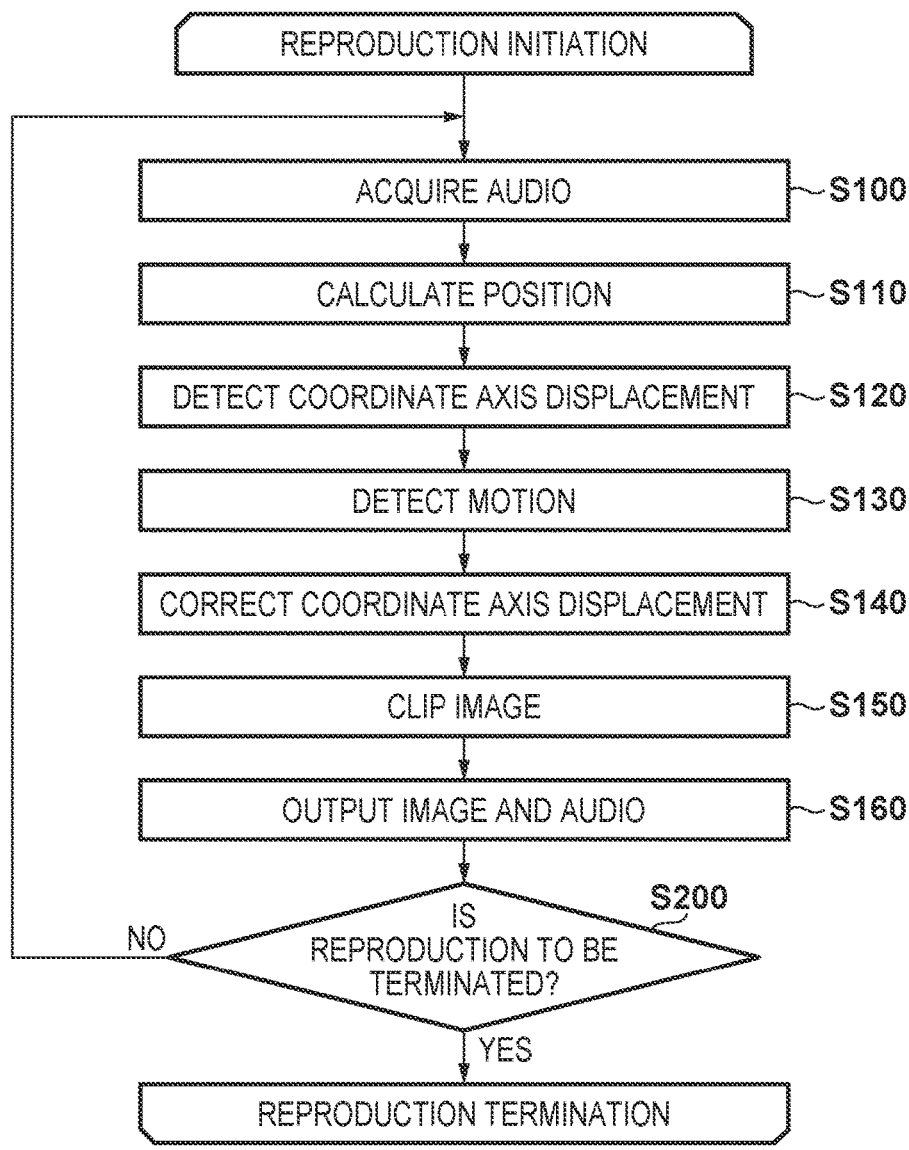
FIG. 5 is the flowchart illustrating a flow of signal processing by the highly realistic sensation reproduction system.

Next, using FIG. 5 explanation is given of a signal processing flow. Each step below is executed based on control by the CPU 990 of the control apparatus 130.

First of all, sound output from the audio output units 111-118 is acquired in the acquisition unit 123 (step S100). An acquired signal of a plurality of acquired channels is outputted to the position calculation unit 134.

Next, in the position calculation unit 134, a direction of an audio output unit with respect to the display apparatus 120 is calculated (step S110). The calculated direction of the audio output unit is output to the coordinate axis displacement detection unit 131. Here, it is not possible to calculate the direction of the audio output unit at a timing when audio is not output from the audio output unit, for example. If it is not possible to calculate the direction of the audio output unit, a control signal is output such that a displacement amount 0 is output to the coordinate axis displacement detection unit 131.

Next, in the coordinate axis displacement detection unit 131, a displacement between the coordinate axes of the image space and the coordinate axes of the acoustic space is detected (step S120). In the coordinate axis displacement detection unit 131, coordinate axes of the acoustic space with respect to the display apparatus 120 are estimated from the input direction of the audio output unit with respect to the display apparatus 120. Furthermore, from the position of the input image that is clipped by the image generation unit 133, the coordinate axes of the image space with respect to the display apparatus 120 are estimated. A displacement amount between the two estimated coordinate axes is output to the coordinate axis displacement correction unit 132.

Next, in the motion detection unit 121, motion of the HMD is detected (step S130). The detected head motion information is output to the image generation unit 133.

Next, in the coordinate axis displacement correction unit 132, coordinate axis displacement correction (step S130) is performed based on the displacement amount detected in the coordinate axis displacement detection unit 131. In the present embodiment, an image to display is rotated in accordance with the magnitude of the detected displacement of the coordinate axes. For example, the coordinate axis displacement correction unit 132 causes the coordinate axes of the image space of a content image to rotate such that the displacement amount becomes smaller based on the displacement amount input. That is, the omnidirectional image of the content in FIG. 3 rotates by an amount β in a clockwise direction. The content image, for which the coordinate axes have been caused to rotate, is output to the image generation unit 133.

Next, in the image generation unit 133, the image from the image space is clipped (step S150) in accordance with a direction of the head (display apparatus 120) of the user. The clipped image is output to the display unit 122. In this way, display control of an image generated in accordance with motion of the display apparatus is performed.

Next, acoustic signals are output from the audio output units 111-118, and the image input from the image generation unit 133 is displayed in the display unit 122 (step S160).

Termination of content reproduction is determined (step S200), and in the case of termination (YES in step S200) the reproduction terminates, and in the case of not terminating (NO in step S200), the processing returns to step S100. In this way, processing of step S100 to step S160 is repeated until the reproduction terminates.

As described above, in the present embodiment, displacement between the coordinate axes of the image space in accordance with the image that the display apparatus 120 displays and the coordinate axes of the acoustic space in accordance with audio output by the audio output apparatus 110 is detected and corrected. Accordingly, by correcting the displacement between the coordinate axes of the acoustic space and the coordinate axes of the image space that is presented, it is possible to provide content without impairing a realistic sensation.

(Other Configurations)

In the present embodiment, explanation was given of an example in which the audio output apparatus 110 arranged eight speakers horizontally, but arrangement of speakers is not limited to this. For example, configuration may be taken to arrange speakers in a vertical direction, or arrange speakers in a dome (hemisphere) shape, or cylindrical shape. In such a case, configuration may be taken to perform coordinate axis displacement correction for three axes, which includes the vertical direction.

In addition, in the present embodiment, explanation was given of an example of a case in which the display apparatus 120 is an HMD, but it may be a handheld-type display apparatus, for example a display apparatus such as a portable game device, a mobile telephone, a tablet-type PC, or the like.

In addition, in the present embodiment, explanation was given of an example of a case in which the real space is something that is captured or subject to a sound recording, but configuration may be taken such that the content image is something clipped at any viewpoint in a virtual space, and to which sound is combined.

In addition, in the present embodiment, explanation was given of an example in which the coordinate axis displacement detection unit 131, the coordinate axis displacement correction unit 132, the image generation unit 133, and the position calculation unit 134 are arranged in one control apparatus 130, but they may be arranged by distributing them. For example, the image generation unit 133 and the position calculation unit 134 may be inside the display apparatus 120.

In addition, in the present embodiment, the acquisition unit 123 was given as a plurality of non-directional microphones, but it may be a plurality of directional microphones that are arranged so that the directivities face in different directions. In this case, configuration may be taken such that the position calculation unit 134 calculates the intensities of inputted signals of a plurality of channels, and the direction of an audio output unit with respect to the display apparatus 120 in accordance with the direction of the directional microphone.

In addition, in the present embodiment, explanation was given of an example in which, when the direction of the audio output unit is detected, a sound source direction is specified in a time period in which a level of the content signal is large. However, configuration may be taken to specify a sound source direction when the signal of a specific channel is sufficiently large in comparison to other channels, in several frequency bands used for direction estimation. By configuring in this way, it is possible to simultaneously detect the directions of a plurality of audio output units if differing signals are output from the audio output units.

In addition, in the present embodiment, although the content signal was used when detecting the direction of an audio output unit, configuration may be taken to use a measurement signal other than for content. A signal that a person cannot hear or will not mind may be used, and configuration may be taken such that a low-level signal for measurement is repeatedly output over a long time to achieve sufficient S/N for direction estimation, by synchronizing and adding the repeated signal. In addition, configuration may be taken to detect direction by using a signal of a frequency that a person will hardly recognize, due to a masking effect or a signal outside the audible frequency band.

In addition, although the audio output apparatus 110, the display apparatus 120, and the control apparatus 130 were illustrated with solid lines for ease of understanding in FIG. 2, an exchange of data between apparatuses may be performed by using any method, regardless of being wired/wireless. When an exchange of data is performed wirelessly, each apparatus is provided with a wireless transceiver. As such a wireless communication method, it is possible to use a wireless LAN or Bluetooth (registered trademark), for example.

While the acquisition unit 123 is moving, in other words while the user is moving their head, the state is such that superficially the audio output unit is moving from the perspective of the acquisition unit 123, and it is considered that estimation accuracy of sound source direction estimation will be degraded. Therefore, configuration may be taken such that the step for detecting coordinate axis displacement (step S120) is only executed when motion of the user is smaller than a threshold value determined by the system. Here, because the precision of each motion sensor, the performance/arrangement of the microphone of the acquisition unit 123, and the like differ depending on the system, the threshold value is decided so that sufficient sound source position estimation precision is obtained for each system.

In addition, acoustic signals generated other than from the audio output units become an impediment to direction estimation. For example, an action sound in accordance with an action by the user or the user's voice will also be a cause of an impediment, and if a plurality of users is present, action sounds of the other users will also be an impediment to direction estimation. Accordingly, configuration may be taken such that an external audio detection unit for detecting external audio generated from other than the audio output units is further provided, and if external sound is detected, the step for performing coordinate position displacement detection is not executed (step S120).

In addition, in the present embodiment, explanation was given of an example of using an acoustic signal in obtaining of a direction of the audio output apparatus 110 with respect to the display apparatus 120, but limitation is not made to a configuration that uses the acquisition unit 123 if it is possible to obtain a relative position relation between the display apparatus 120 and the audio output apparatus 110.

For example, another signal, such as visible light, a radio wave, or infrared light may be used. For example, as illustrated in FIG. 6A, configuration may be taken to provide an image capturing unit 124 in place of the acquisition unit 123 in the display apparatus 120. The position calculation unit 134 recognizes an audio output unit from a captured image captured by the image capturing unit 124, and performs position detection for the audio output unit with respect to the display apparatus 120. Here, configuration may be taken to add a marker or the like to a housing surface of the audio output units for individually specifying the plurality of audio output units by image recognition. In addition, it is desirable to configure such that it is possible to capture an audio output unit regardless of what direction the image capturing unit 124 is facing.

Figure 6B:
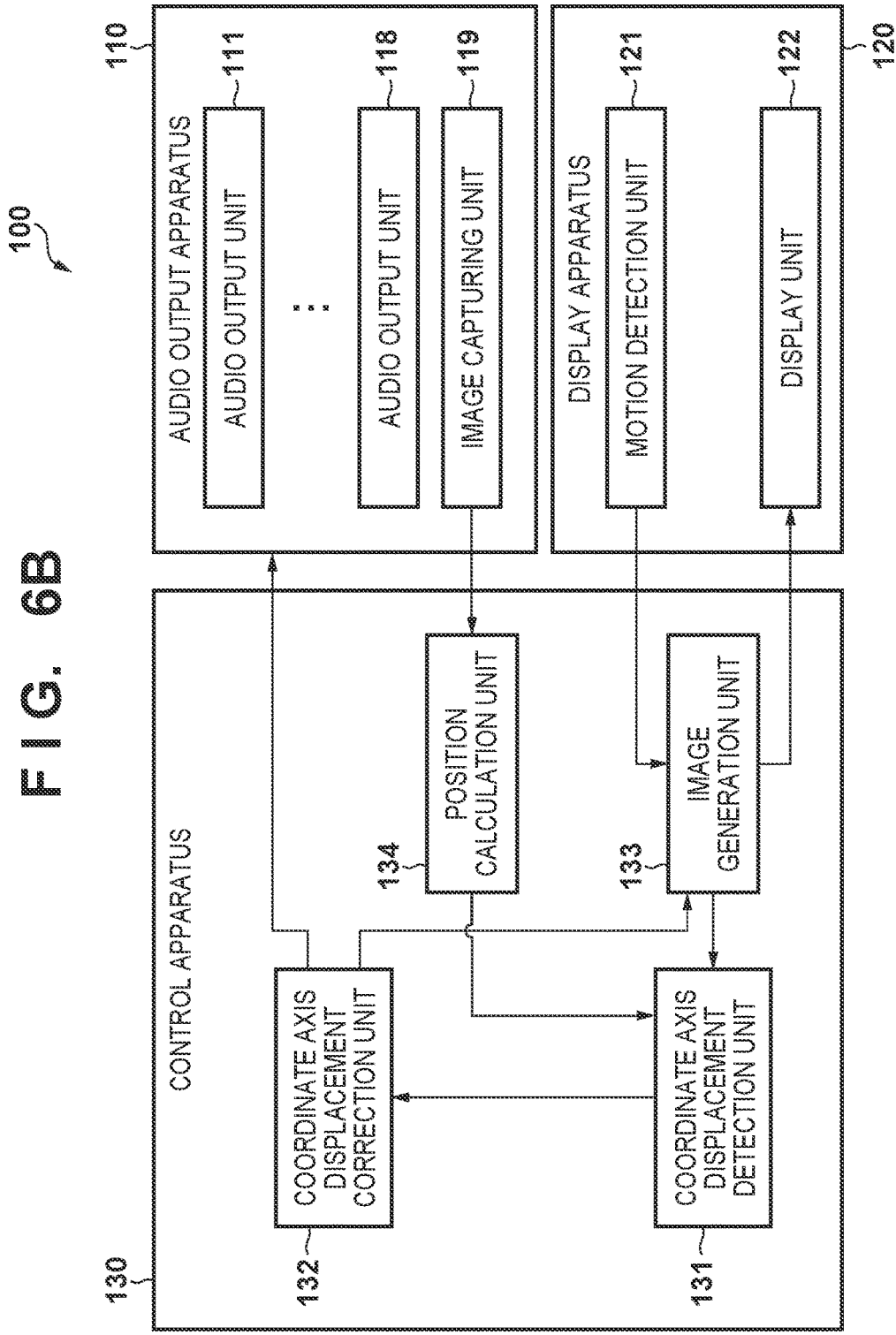

In addition, in the present embodiment, the direction of the audio output apparatus 110 with respect to the display apparatus 120 is calculated, but configuration may be taken to conversely calculate the direction of the display apparatus 120 from the audio output apparatus 110. For example, configuration may be taken such that, as illustrated in FIG. 6B, the audio output apparatus 110 is provided with an image capturing unit 119, and that the position calculation unit 134 detects the direction of the display apparatus 120 with respect to the audio output apparatus 110 from an image captured by the image capturing unit 119. In this way, it is possible to obtain a relative position relation between the display apparatus 120 and the audio output apparatus 110, and effectively correct displacement of coordinate axes by detecting the displacement of coordinate axes based on the obtained position relation.

In addition, although explanation was given in the present embodiment of an example in which the coordinate axis displacement correction unit 132 always performs coordinate axis displacement correction, configuration may be taken to not perform coordinate axis displacement correction if a displacement amount is small. In addition, although in the present embodiment explanation was given of an example in which the coordinate axis displacement correction unit 132 performs correction such that the coordinate axes of the image space approaches the coordinate axes of the acoustic space, configuration may be taken such that the coordinate axes of the acoustic space approaches the coordinate axes of the image space (details explained later).

In another embodiment of the present invention, explanation is given of an example configuration that enables a highly realistic sensation to be maintained by correcting the displacement of coordinate axes at a timing when it would be hard for a user to perceive the correction of the displacement of the coordinate axes.

(Highly Realistic Sensation Reproduction System)

FIG. 7 is a block diagram that illustrates a configuration of the highly realistic sensation reproduction system 100 according to the present embodiment. Because the highly realistic sensation reproduction system 100 according to the present embodiment is almost the same as the configuration of the previously described embodiment, detailed explanation is omitted for configurations in common, and explanation focuses on points of difference.

Similarly to the previously described embodiment (FIG. 1), the highly realistic sensation reproduction system 100 according to the present embodiment is provided with the audio output apparatus 110, the display apparatus 120, and the control apparatus 130, and each apparatus has functional elements similar to those of the previously described embodiment. In the present embodiment, the detection result of the motion detection unit 121 differs from the previously explained embodiment in that it is also output to the coordinate axis displacement correction unit 132 in addition to the image generation unit 133.

In the present embodiment, the coordinate axis displacement correction unit 132 decides whether to perform correction in accordance with the existence or absence of head motion of a user input from the motion detection unit 121. Configuration is taken such that correction is performed if there is head motion, correction is not performed if there is no motion. If performing displacement correction, a displacement amount is output to the image generation unit 133.

The image generation unit 133 clips and outputs a portion of the input omnidirectional image, in accordance with the output of the motion detection unit 121. If a displacement amount of the coordinate axes is input from the coordinate axis displacement correction unit 132, a clipping region of the image is modified in accordance with the displacement amount.

Figure 8:
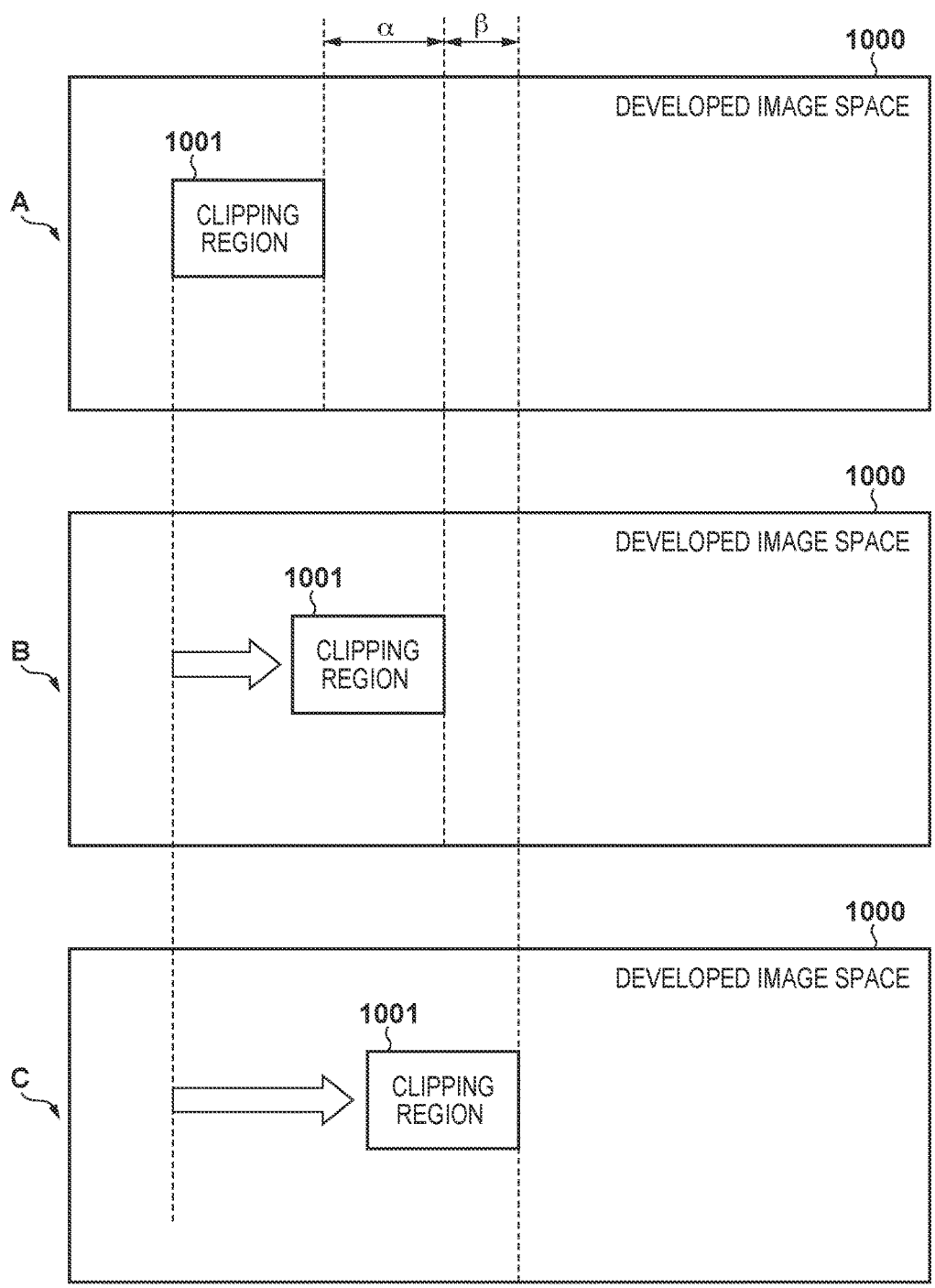
FIG. 8 is schematic diagrams illustrating states in which a region clipped from an omnidirectional image is modified.

FIG. 8 is views that illustrate a situation in which a clipping region that is clipped from the omnidirectional image is modified. As illustrated by A in FIG. 8, for example, the image generation unit 133 clips and outputs a clipping region 1001 from an image space 1000 into which an omnidirectional image has been developed. Here, if an amount of rotation of the head detected by the motion detection unit 121 is taken as $\alpha$, the clipping region 1001 is moved by the amount $\alpha$ in the image space, as illustrated by B in FIG. 8. Furthermore, if a displacement amount $\beta$ is input from the coordinate axis displacement correction unit 132, configuration is such that the image generation unit 133 moves the clipping region 1001 by the amount $\alpha+\beta$ in the image space, as illustrated by C in FIG. 8. The clipped image is output to the display unit 122.

(Signal Processing)

Next, using FIG. 5 explanation is given of a signal processing flow. The flow of signal processing of the present embodiment is illustrated by the flowchart of FIG. 5, similarly to the previously described embodiment. Each step below is executed based on control by the CPU 990 of the control apparatus 130. Because step S100, step S110 and step S120 are mostly the same as in the previously described embodiment, explanation thereof is omitted.

Next, in the motion detection unit 121, user head motion detection is performed (step S130). The detected head motion information is output to the image generation unit 133 and the coordinate axis displacement correction unit 132.

Next, a displacement amount for correction is output from the coordinate axis displacement correction unit 132 (step S140). If there is no head motion, the coordinate axis displacement correction unit 132 outputs a displacement amount 0 such that a correction is not performed.

Next, in the image generation unit 133 clipping of the image is performed (step S150). An image is clipped from the image space in accordance with the displacement amount obtained in step S140 and the head motion amount detected in step S130, and output to the display unit 122. Because processing in step S160 onward is similar to that of the previously described embodiment, explanation thereof is omitted.

As described above, in the present embodiment, correction of coordinate axis displacement is not executed while the head is stationary, and displacement of the coordinate axes is corrected in accordance with the display apparatus 120 detecting motion, in other words the user moving their head. Accordingly, it is hard for a user to perceive a correction, and it is possible to perform the correction without impairing a realistic sensation.

(Other Configurations)

In the present embodiment, for ease of understanding the coordinate axis displacement correction unit 132 decided whether to perform correction by the existence or absence of motion of the head, but configuration may be taken such that correction is not performed in a case such as minute swaying of the head. For example, configuration may be taken so as to not perform correction if a rotation speed of the head is lower than a threshold value determined in accordance with the system, and perform correction if the rotation speed exceeds the threshold value. Because this threshold value differs depending on a system configuration, configuration may be taken to decide it in advance for each system.

In the present embodiment, no particular restriction was provided on the displacement amount $\beta$ and the amount of rotation $\alpha$ of the head, but it is possible to further make correction hard to perceive by configuring so as to set a displacement amount that is corrected in one go to be small with respect to $\alpha$, and perform correction gradually each time a head rotation is detected.

Furthermore, configuration may be taken to provide a sight-line detection unit for detecting a user's line of sight, and deciding whether to perform displacement correction by determining an existence or absence of motion of the line of sight. For example, there may be a case in which, if a user changes from maintaining the same stance to a tired posture, the line of sight views the same position but the head moves. If correction is performed in such a case, the user will perceive the correction and feel uncomfortable. Therefore, configuration may be taken such that correction is performed when a line of sight direction and a rotation direction of the head are the same, and not perform correction when the direction of the line of sight and the rotation direction of the head are opposite.

Next, explanation is given of a configuration that maintains a highly realistic sensation by processing a region of the image to display that is visually hard to perceive to correct displacement of coordinate axes. As an example of such a configuration, in still another embodiment of the present invention, explanation is given of an example in which a portion of an image to display is caused to expand or contract in accordance with the magnitude of the detected displacement of the coordinate axes. Note that, in the present embodiment, if simultaneously there are a plurality of users, a correctable image segment is detected, and correction is performed when a field of view passes that image segment.

(Highly Realistic Sensation Reproduction System)

Figure 9:
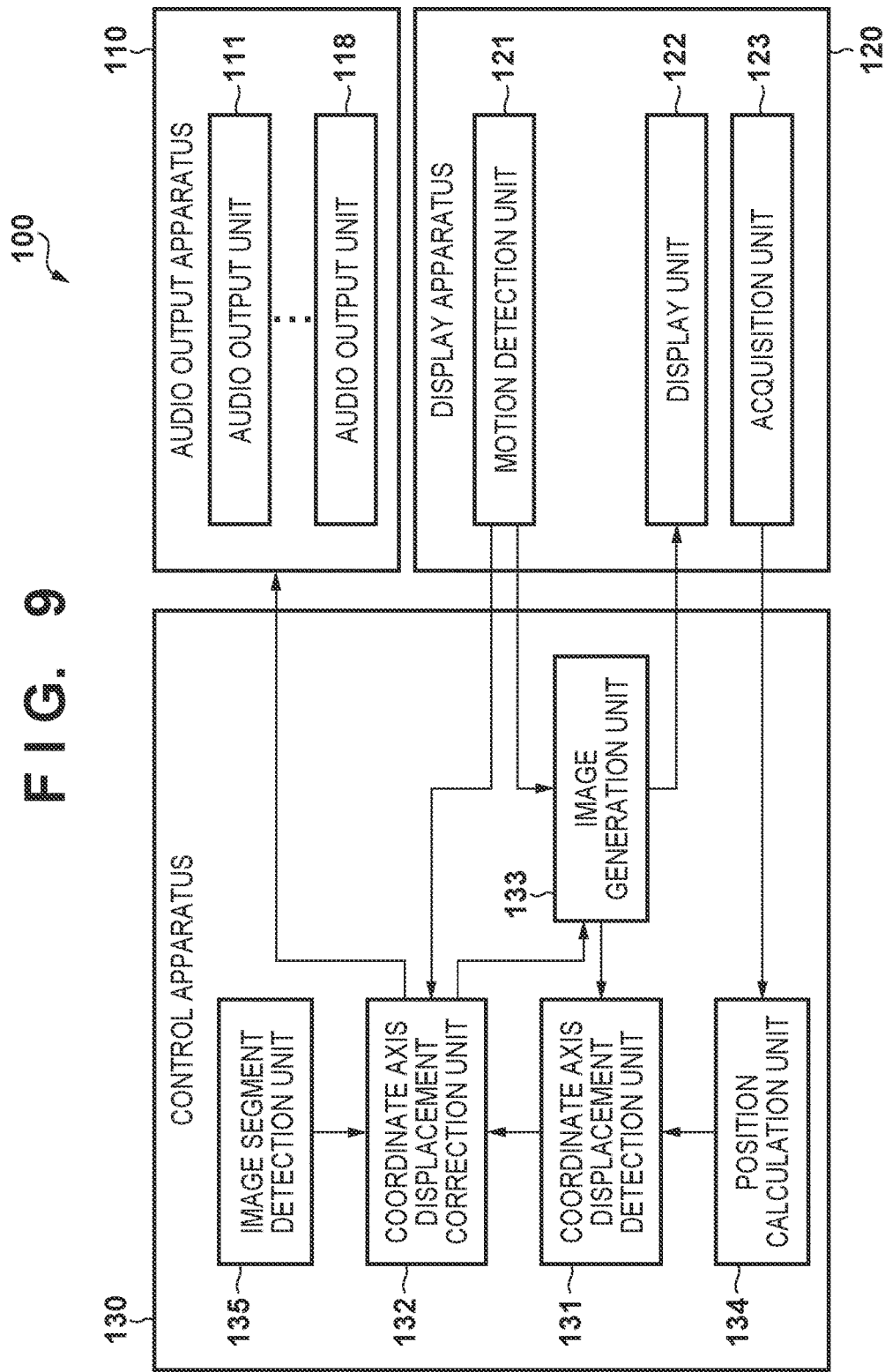
FIG. 9 is a block diagram illustrating a configuration of a highly realistic sensation reproduction system.

FIG. 9 is a block diagram that illustrates a configuration of the highly realistic sensation reproduction system according to the present embodiment. Because the highly realistic sensation reproduction system 100 according to the present embodiment is almost the same as the configuration of the previously described embodiment, detailed explanation is omitted for configurations in common, and explanation focuses on points of difference.

Similarly to the previously described embodiment (FIG. 1), the highly realistic sensation reproduction system 100 according to the present embodiment is provided with the audio output apparatus 110, the display apparatus 120, and the control apparatus 130. The display apparatus 120 is mounted on the head of each user, and for the audio output apparatus 110, one apparatus is used by a plurality of users commonly. The audio output apparatus 110, and the display apparatus 120 have similar functional elements to those of the embodiment illustrated by FIG. 1, but the motion detection unit 121 of the display apparatus 120, as in the embodiment illustrated by FIG. 7, the coordinate axis displacement correction unit 132 also outputs a motion detection result, in addition to the image generation unit 133.

In addition to the configuration of the embodiment of FIG. 1, the control apparatus 130 is further provided with an image segment detection unit 135. The image segment detection unit 135 detects an image region in the image space for which a correction can be performed. Here, the image region for which correction is possible refers to a region for which there is little sense of unnaturalness due to expansion or contraction of an image. The image segment detection unit 135 detects and outputs an even region, such as a region of a blue sky, as a correctable region, for example. Here, an even image region refers to a region having little difference in color components, such as tint and luminance, with neighboring pixels, for example. In the present embodiment, an even image region in an area larger than a segment to consecutively clip with respect to at least an elevation angle direction is assumed to be a correctable region.

The coordinate axis displacement correction unit 132 performs correction for each user. At this point the coordinate axes of the acoustic space cannot be corrected because they are common to a plurality of users. Thus, the coordinate axis displacement correction unit 132 performs correction so as to make the coordinate axes of the image segment approach the coordinate axes of the acoustic space. The coordinate axis displacement correction unit 132 outputs information of image clipping and region expansion or contraction to the image generation unit 133, from the inputted displacement amount, a motion detection result, and an image segment detection result.

Figure 10:
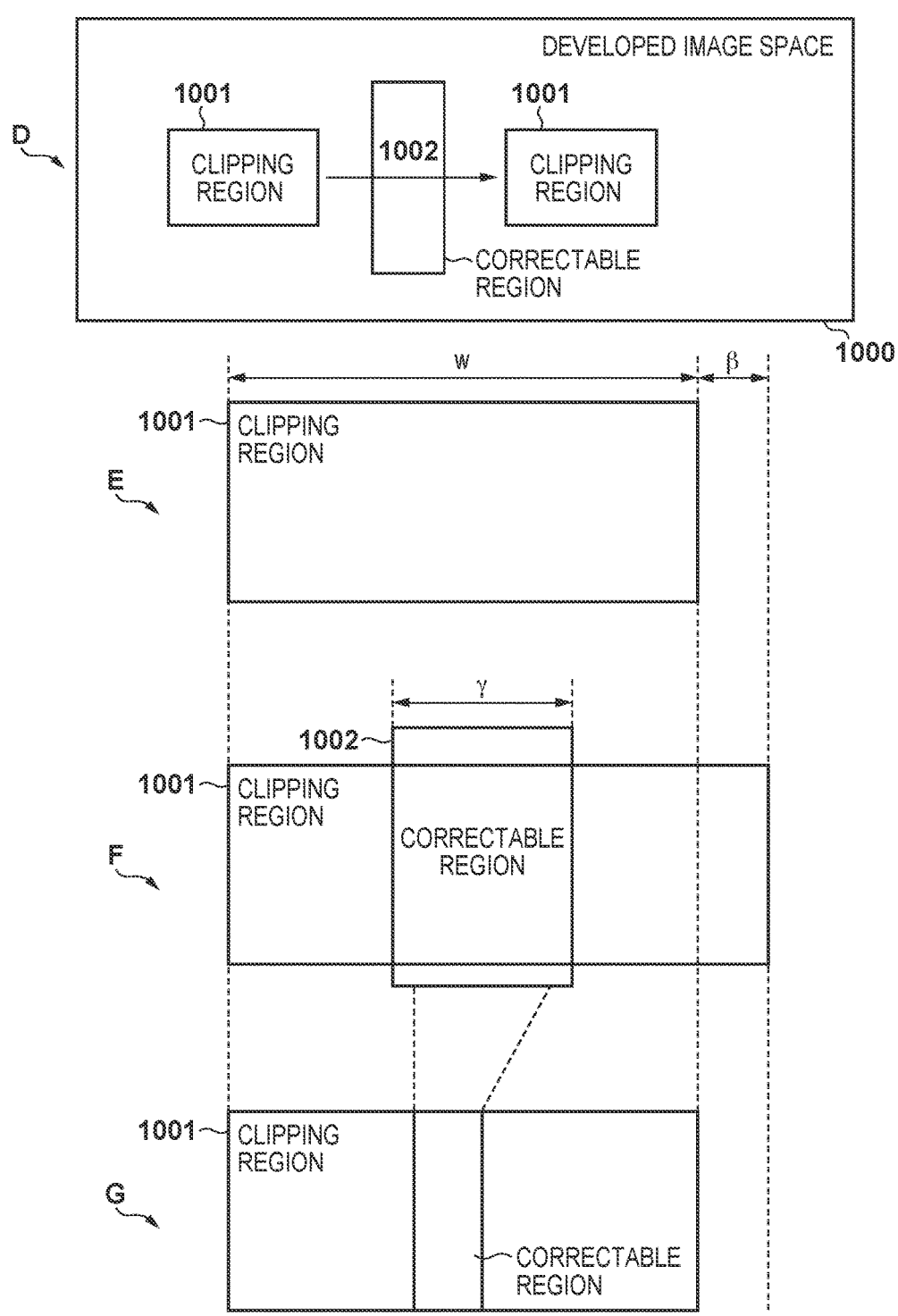
FIG. 10 is schematic diagrams illustrating image clipping states in a correctable region.

The image generation unit 133 generates an image to display by the display unit 122 from the inputted information. Regarding FIG. 10, if the clipping region 1001 moves so as to pass through the correctable region 1002, as illustrated by D in FIG. 10, for example, correction information is output. E in FIG. 10 illustrates the clipping region 1001 as a whole. As illustrated by F in FIG. 10, while the correctable region 1002 is included in the clipping region 1001, the clipping region 1001 is clipped to a w+β region, wherein the displacement amount β is added to a width w of a normal clipping region. Next, as illustrated by G in FIG. 10, a region of the correctable region 1002 out of the clipped region is expanded or contracted by a ratio of $\gamma/(\gamma+\beta)$. Here γ is the width of the correctable region. The image generation unit 133 outputs an image generated as described above.

(Signal Processing)

Figure 11:
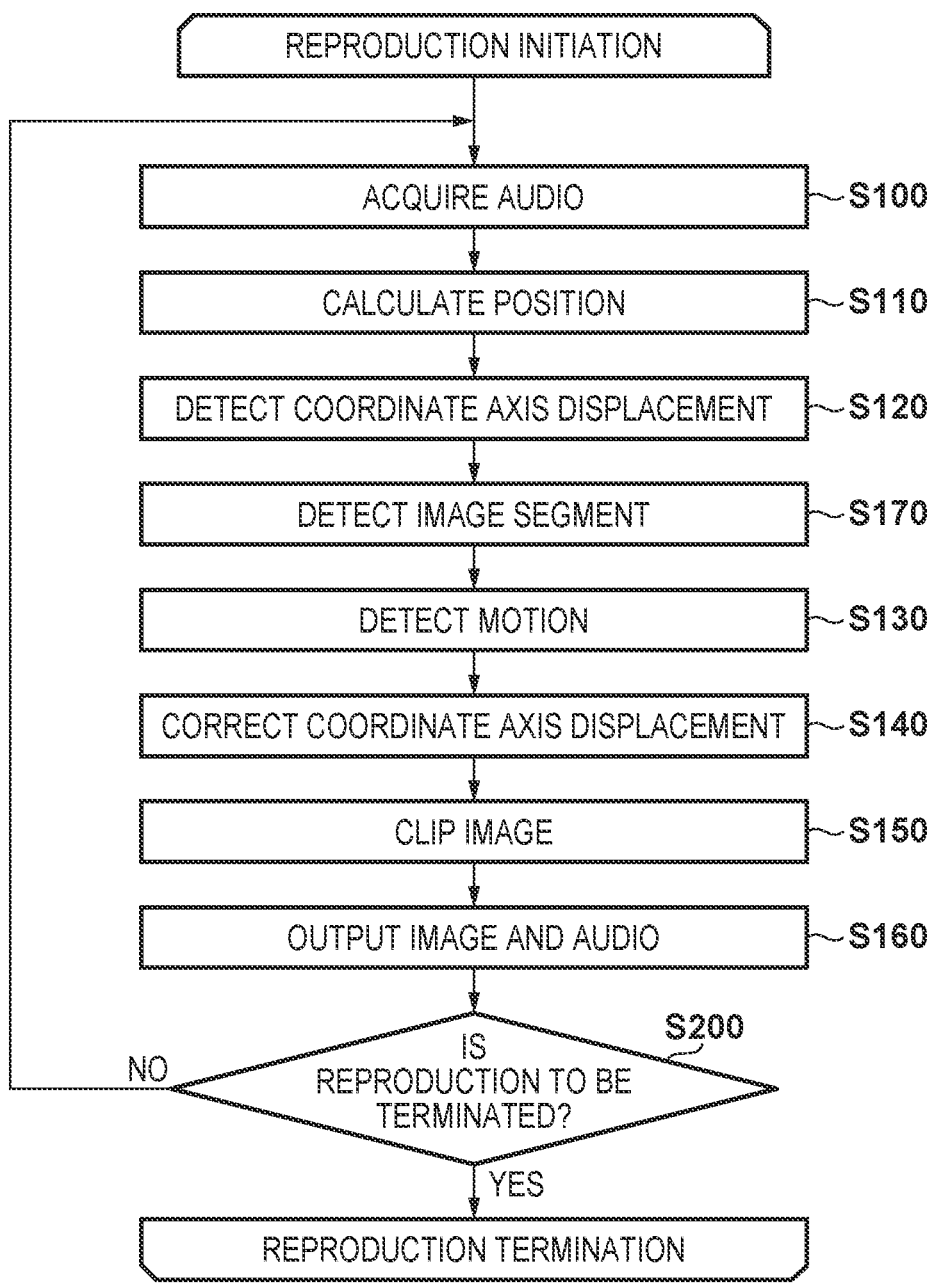
FIG. 11 is a flowchart illustrating a flow of signal processing by the highly realistic sensation reproduction system.

Next, using FIG. 11 explanation is given of a signal processing flow. Each step below is executed based on control by the CPU 990 of the control apparatus 130.

Because step S100 to step S120 are similar to that in the previously described embodiment (FIG. 5), explanation thereof is omitted. Next, detection of the correctable region is performed in the image segment detection unit 135 (step S170). A correctable region in the periphery of the current clipping region 1001 is detected and output to the coordinate axis displacement correction unit 132.

Next, because the subsequent step S130 is mostly similar to in the previously described embodiment, explanation thereof is omitted. Next, in the coordinate axis displacement correction unit 132, information for coordinate axis displacement correction is generated (step S140). The generated correction information is output to the image generation unit 133.

Next, in the image generation unit 133, the image space is clipped, and an image for which coordinate axis displacement correction is performed is generated (step S150). As described above, in the present embodiment, an image is expanded or contracted in a correctable region for which it is hard to visually perceive processing of the image. An image generated based on the input correction information is output to the display unit 122. Because processing in step S160 onward is similar to that of the previously described embodiment, explanation thereof is omitted.

By configuring as described above to extract a region for which expansion or contraction is hard to notice as a correctable region, and performing expansion or contraction when an image clipping region passes through the correctable region, it is possible to perform correction that is hard to perceive for a user, and does not impair a realistic sensation.

In addition, in the present embodiment, in the highly realistic sensation reproduction system 100 having a plurality of the display apparatus 120, the coordinate axes of the image space is made to approach the coordinate axes of the acoustic space for each display apparatus 120. Accordingly, it is possible to provide content of a highly realistic sensation simultaneously to a plurality of users, who each independently act.

(Other Configurations)

In the present embodiment, an even portion of an image was detected as a correctable region, but another region may be used if it is a portion for which it is hard to visually perceive expansion or contraction of the image.

In addition, in the present embodiment, explanation was given of an example of performing correction of coordinate axis displacement by causing an image of a correctable region to expand or contract in the image generation unit 133, but configuration may be taken to perform correction by deleting a portion of the image. In such a case, the image segment detection unit 135 detects a deletable region. For example, it is possible to detect a region in which there is repetition of a pattern, and delete one instance of that pattern. In addition, configuration may be taken so as to detect an edge of an object at a short distance within the image space, and detect a periphery thereof as a correctable region. In such a case, a portion of the background of the periphery of the object at the short distance in the image generation unit 133 is deleted.

In addition, in the present embodiment, the correctable region was detected as a space, but configuration may be taken to detect a correctable region in a time domain for a moving image. For example, configuration may be taken such that the image segment detection unit 135 is a scene separation detection unit, which detects a separation of scenes of content that is reproduced, and at that timing rotates coordinate axes of the image space. Regarding detection of a scene separation, for example, a frame for which a change of luminance is large is detected as a scene separation, based on a luminance difference with an adjacent frame with respect to an omnidirectional image. Because of this, it is possible to correct a displacement of coordinate axes between an image space and an acoustic space without losing a realistic sensation for content.

In a previously described embodiment, explanation was given of an example of correcting displacement of coordinate axes by making the coordinate axes of an image space approach the coordinate axes of the acoustic space. In yet another embodiment of the present invention, explanation is given of an example of making the coordinate axes of an acoustic space approach the coordinate axes of the image space. Specifically, explanation is given of a configuration that detects a correctable sound period, performing correction of the detected sound period, and in addition storing displacement information.

(Highly Realistic Sensation Reproduction System)

Figure 12:
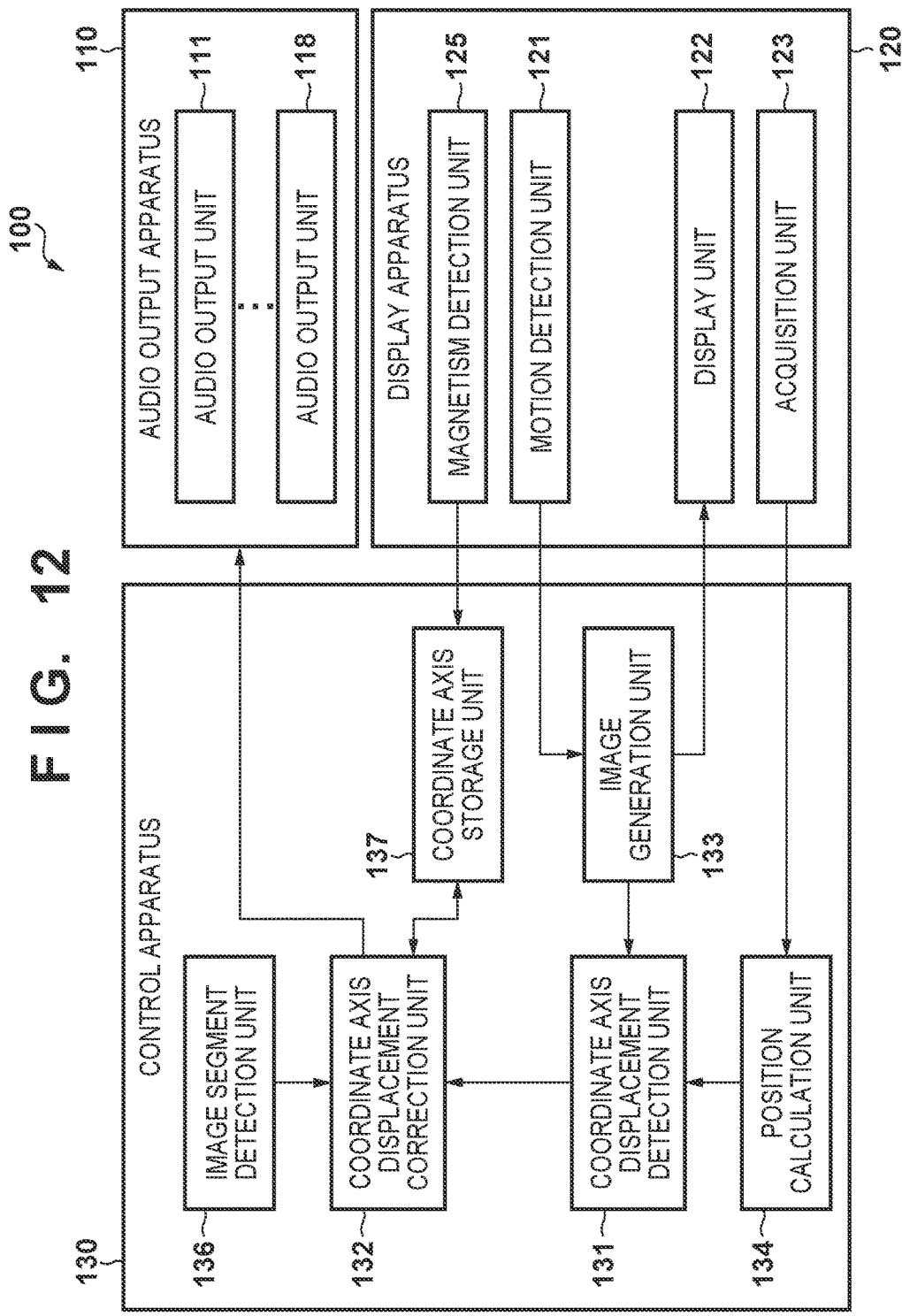
FIG. 12 is a block diagram illustrating a configuration of the highly realistic sensation reproduction system.

FIG. 12 is a block diagram that illustrates a configuration of the highly realistic sensation reproduction system according to the present embodiment. Because the highly realistic sensation reproduction system 100 according to the present embodiment is almost the same as the configuration of the previously described embodiment, detailed explanation is omitted for configurations in common, and explanation focuses on points of difference.

Similarly to the previously described embodiment (FIG. 1), the highly realistic sensation reproduction system 100 according to the present embodiment is provided with the audio output apparatus 110, the display apparatus 120, and the control apparatus 130, and the audio output apparatus 110 has functional elements similar to those of the previously described embodiment. In addition to the configuration of the previously described embodiment, the display apparatus 120 is further provided with a magnetism detection unit (geomagnetism detection unit) 125. A magnetism detection unit 125 is a detection unit that detects a direction of a magnetic field in the periphery of the display apparatus 120, and is for example realized by an electronic compass. The magnetism detection unit 125 outputs the detected direction of geomagnetism in relation to the display apparatus 120 to the control apparatus 130.

In addition to the configuration of a previously described embodiment (FIG. 1), the control apparatus 130 is further provided with a sound period detection unit 136, and a coordinate axis storage unit 137. The sound period detection unit 136 detects a correctable segment of an input acoustic signal. The sound period detection unit 136 detects a period of silence, for example, as a correctable segment, and outputs it to the coordinate axis displacement correction unit 132.

From the displacement amount input from the coordinate axis displacement detection unit 131, the coordinate axis displacement correction unit 132 corrects the acoustic signal so that the coordinate axes of the acoustic space approaches the coordinate axes of the image space. For example, it is possible to cause the coordinate axes of the acoustic space to rotate by panning of a phase or sound amount, in accordance with a magnitude of the detected displacement of the coordinate axes. In a situation such as in FIG. 2, assume that signals output from the coordinate axis displacement correction unit 132 to the audio output units 111-118 are respectively Sig1 through Sig8. Here, in a case of causing the acoustic space to rotate only 22.5 degrees, which is half of angles arranged between adjacent speakers, halves of a signal that should have been input to audio output unit 111 are respectively output to audio output unit 111 and audio output unit 112. Similarly, halves of signals of other channels are output to adjacent speakers. Accordingly, if a signal input to audio output unit 111 is assumed to be Sig1', then it is possible to express Sig1' as in [No. 1] below.

$$\mathrm{Sig1'} = \tfrac{1}{2} \times (\mathrm{Sig1} + \mathrm{Sig2}) \qquad [\text{No. 1}]$$

In this way, it is possible to perform correction of the coordinate axes of the acoustic space by performing panning to each acoustic signal of eight channels output to the audio output units 111-118. The coordinate axis displacement correction unit 132 executes the correction of the coordinate axes of the acoustic space described above when a period of silence is detected in the sound period detection unit 136. By correcting the displacement of the coordinate axes in a period of silence for audio output, it is possible to maintain a realistic sensation without having a user perceive the correction of the displacement of the coordinate axes.

The coordinate axis storage unit 137 stores a relative angle of the coordinate axes of the image space and the coordinate axes of the acoustic space, which have been corrected to match by the coordinate axis displacement correction unit 132, with respect to the direction of the geomagnetism input from the magnetism detection unit 125. The coordinate axis storage unit 137 outputs the direction of the geomagnetism obtained from the magnetism detection unit 125 and a relative angle between the direction of the geomagnetism and the stored coordinate axes, at a time such as when a power source is input again.

(Signal Processing)

Figure 13:
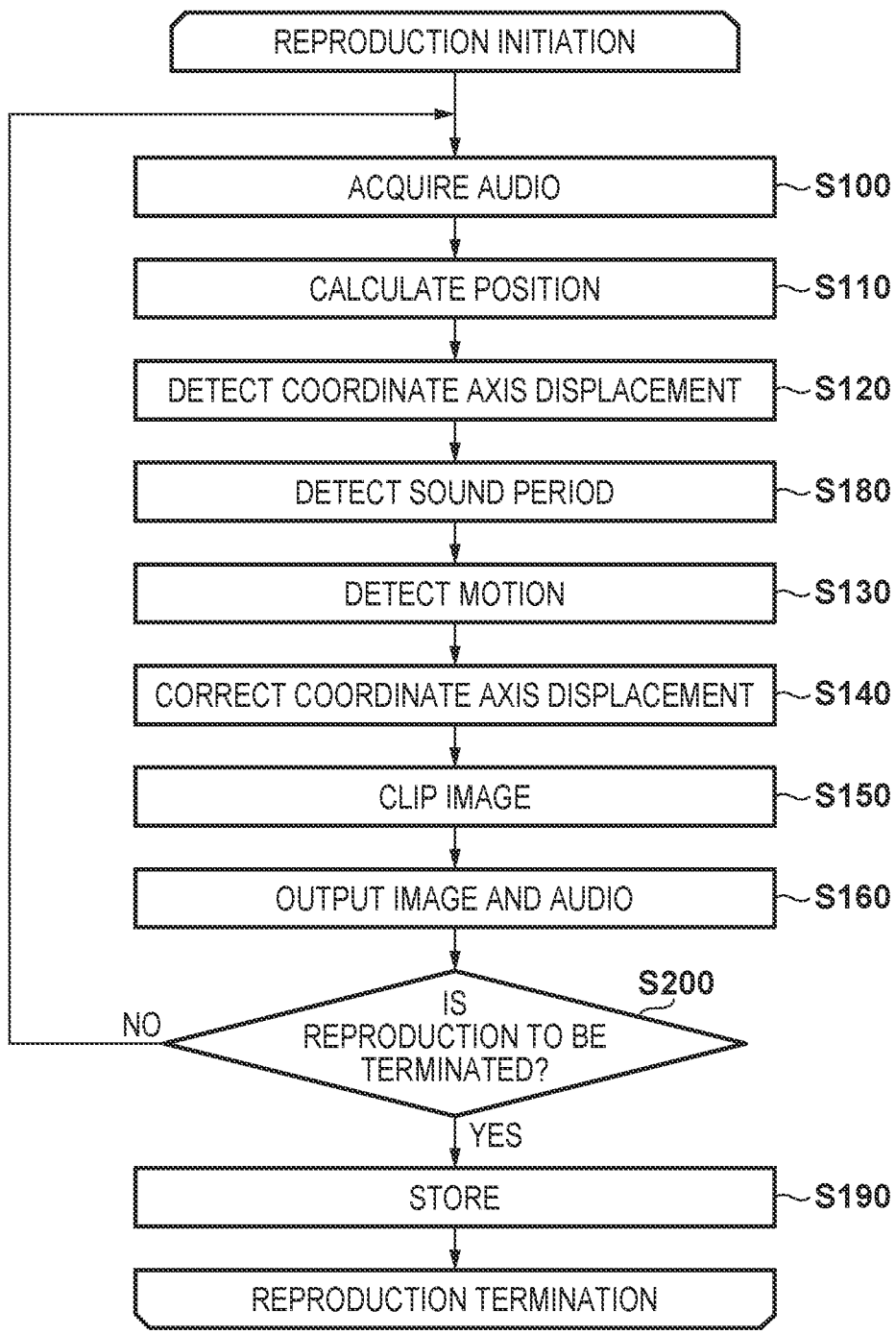
FIG. 13 is a flowchart illustrating a flow of signal processing by the highly realistic sensation reproduction system.

Next, using FIG. 13 explanation is given of a signal processing flow. Each step below is executed based on control by the CPU 990 of the control apparatus 130. Because step S100 to step S120 are substantially similar to that in the above described embodiment, explanation thereof is omitted.

Next, the sound period detection unit 136 detects a period of silence of a signal output to the audio output unit (step S180). A result of the detection of a period of silence is output to the coordinate axis displacement correction unit 132. Because the subsequent step S130 is mostly similar to in the above described embodiment, explanation thereof is omitted.

Next, the coordinate axis displacement correction unit 132 performs correction so that the coordinate axes of the acoustic space approaches the coordinate axes of the image space (step S140). The acoustic signal for which correction has been performed is output to the audio output apparatus 110.

Because the subsequent step S150 to step S160 are similar to that in the previously described embodiment, explanation thereof is omitted. Termination of content reproduction is determined (step S200), and in the case of termination (YES in step S200), the processing proceeds step S190, and in the case of not terminating (NO in step S200), the processing returns to step S100.

In step S190, the coordinate axis storage unit 137 stores a difference between the direction of the geomagnetism and the coordinate axes of the corrected and matched image space and acoustic space. Information of the stored difference is used as an initial value for coordinate axis displacement correction when the power source is input again, or when reproduction is next initiated.

As described above, by detecting a period of silence and, at a timing thereof, making the coordinate axes of an acoustic space approach the coordinate axes of an image space, it is possible to perform correction that is hard for a user to perceive and does not impair a realistic sensation. In addition, by storing a difference between a geomagnetism and the coordinate axes of an image space and an acoustic space, the realistic sensation is not impaired and the coordinate axes of the acoustic space and the coordinate axes of the image space do not become displaced greatly, even when a power source is input again.

(Other Configurations)

In the present embodiment, the sound period detection unit 136 detects a period of silence and corrects displacement of the coordinate axes by causing the acoustic space to rotate in the period of silence, a timing at which to perform correction of the coordinate axes is not limited to this if the correction of displacement of the coordinate axes is hard to perceive. For example, configuration may be taken to correct displacement of the coordinate axes in a time period in which output audio is isotropic. In such a case, a case of signals such as where an eight-channel acoustic signals are the same is detected. For example, the spectrums of eight-channel acoustic signals are compared, and a period for which amount of difference of the spectrums is small is detected as a period in which the acoustic signals are isotropic. The sound period detection unit 136 may also be an isotropy detection apparatus that detects isotropy of acoustic signals. If, from a user's perspective, an acoustic space is isotropic, then even if the acoustic space is corrected, it would not be perceived by the user.

In the present embodiment, content of an acoustic signal is assumed to be an eight-channel waveform signal output to eight audio output units 111-118, but it may be object-based content that has a position of a sound source and waveform signal for each sound source, for example. In the case of object-based content, a signal to be output to each speaker is generated from a signal of a sound source, a position of the sound source, and an arrangement of the speakers. Accordingly, configuration may be taken to provide a sound source information obtainment unit that obtains information for each sound source, and to detect a period of silence for each sound source, and independently perform coordinate axis displacement correction for each sound source. By correcting displacement of the coordinate axes for each sound source of audio that is output in this way, it is possible to perform correction of displacement of the coordinate axes for various types of audio.

By virtue of the present invention, it is possible to provide a technique that can cause coordinate axes of an acoustic space to match coordinate axes of an image space.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-152688, filed on Jul. 31, 2015, which is hereby incorporated by reference herein in its entirety.

What is claimed is:

1. A control apparatus, comprising:
one or more processors; and
at least one memory coupled to the one or more processors, the at least one memory storing instructions which, when executed by the one or more processors, cause the control apparatus to:
detect, based on a result of acquiring audio outputted from an output apparatus, the result of acquiring being acquired in a display apparatus that displays an image in accordance with motion, and the image that the display apparatus displays, displacement between coordinate axes of an image space according to the image that the display apparatus displays and coordinate axes of an acoustic space according to audio outputted by the output apparatus; and
correct the detected displacement of the coordinate axes.

2. The control apparatus according to claim 1, wherein, in correcting the detected displacement, the instructions, when executed by the one or more processors, cause the control apparatus to correct the detected displacement of the coordinate axes by controlling an image that the display apparatus is caused to display.

3. The control apparatus according to claim 1, wherein, in correcting the detected displacement, the instructions, when executed by the one or more processors, cause the control apparatus to correct the displacement of the coordinate axes at a timing at which it is hard for a user to perceive the correction of the displacement of the coordinate axes.

4. The control apparatus according to claim 3, wherein, in correcting the detected displacement, the instructions, when executed by the one or more processors, cause the control apparatus to correct the displacement of the coordinate axes in accordance with detecting motion of the display apparatus.

5. The control apparatus according to claim 3, wherein, in correcting the detected displacement, the instructions, when executed by the one or more processors, cause the control apparatus to correct the displacement of the coordinate axes at a scene separation of content reproduced by the display apparatus and the output apparatus.

6. The control apparatus according to claim 1, wherein, in correcting the detected displacement, the instructions, when executed by the one or more processors, cause the control apparatus to correct the displacement of the coordinate axes by making the coordinate axes of the image space approach the coordinate axes of the acoustic space.

7. The control apparatus according to claim 6, wherein the instructions, when executed by the one or more processors, further cause the control apparatus to cause an image to be displayed to rotate in accordance with a magnitude of the detected displacement of the coordinate axes.

8. The control apparatus according to claim 6, wherein, in correcting the detected displacement, the instructions, when executed by the one or more processors, cause the control apparatus to correct the displacement of the coordinate axes by processing a visually hard-to-perceive region of the image to be displayed.

9. The control apparatus according to claim 8, wherein the instructions, when executed by the one or more processors, further cause the control apparatus to cause a part of the image to be displayed to expand or contract in accordance with a magnitude of the detected displacement of the coordinate axes.

10. The control apparatus according to claim 8, wherein the instructions, when executed by the one or more processors, further cause the control apparatus to delete a part of the image to be displayed in accordance with a magnitude of the detected displacement of the coordinate axes.

11. The control apparatus according to claim 6, wherein the instructions, when executed by the one or more processors, further cause the control apparatus to make the coordinate axes of the image space approach the coordinate axes of the acoustic space, for each of a plurality of the display apparatus.

12. The control apparatus according to claim 6, wherein the instructions, when executed by the one or more processors, further cause the control apparatus to cause an acoustic space of an audio to be outputted to rotate in accordance with a magnitude of the detected displacement of the coordinate axes.

13. The control apparatus according to claim 6, wherein, in correcting the detected displacement, the instructions, when executed by the one or more processors, cause the control apparatus to correct the displacement of the coordinate axes in a period of silence for audio that is outputted.

14. The control apparatus according to claim 6, wherein, in correcting the detected displacement, the instructions, when executed by the one or more processors, cause the control apparatus to correct the displacement of the coordinate axes in a time period in which the audio that is outputted is isotropic.

15. The control apparatus according to claim 6, wherein, in correcting the detected displacement, the instructions, when executed by the one or more processors, cause the control apparatus to correct the displacement of the coordinate axes for each sound source of audio that is outputted.

16. The control apparatus according to claim 1, wherein the instructions, when executed by the one or more processors, further cause the control apparatus to:
obtain a relative position relation between the display apparatus and the output apparatus,
wherein detecting the displacement of the coordinate axes includes detecting the displacement of the coordinate axes based on the obtained position relation.

17. The control apparatus according to claim 16, wherein the instructions, when executed by the one or more processors, further cause the control apparatus to obtain the position relation by an acquisition unit provided in the display apparatus.

18. The control apparatus according to claim 16, wherein the instructions, when executed by the one or more processors, cause the control apparatus to obtain the position relation by a captured image of the output apparatus or the display apparatus that an image capturing unit captured.

19. The control apparatus according to claim 1, wherein the instructions, when executed by the one or more processors, further cause the control apparatus to:
detect geomagnetism, and
store a relative angle of the coordinate axes of the acoustic space and the image space, for which correction has been performed, with respect to a direction of the geomagnetism,
wherein correcting the displacement of the coordinate axes includes correcting the displacement of the coordinate axes based on the relative angle and the detected geomagnetism.

20. A control apparatus, comprising:
one or more processors; and
at least one memory coupled to the one or more processors, the at least one memory storing instructions which, when executed by the one or more processors, cause the control apparatus to:
detect, based on an image that a display apparatus that displays the image in accordance with motion displays, displacement between coordinate axes of an image space according to the image that the display apparatus displays and coordinate axes of an acoustic space according to audio outputted by an output apparatus; and
correct the detected displacement of the coordinate axes.

21. A correction method comprising:
detecting, based on a result of acquiring audio outputted from an output apparatus, the result of acquiring being acquired in a display apparatus that displays an image in accordance with motion, and the image that the display apparatus displays, displacement between coordinate axes of an image space according to the image that the display apparatus displays and coordinate axes of an acoustic space according to audio outputted by the output apparatus; and
correcting the detected displacement of the coordinate axes.

* * * * *